United States Patent [19]

Fujisawa et al.

[11] Patent Number: 4,654,873
[45] Date of Patent: Mar. 31, 1987

[54] SYSTEM AND METHOD FOR SEGMENTATION AND RECOGNITION OF PATTERNS

[75] Inventors: Hiromichi Fujisawa, Tokorozawa; Yasuaki Nakano, Hino; Hitoshi Komatsu; Shozo Kadota, both of Kanagawa; Kiyomichi Kurino, Odawara, all of Japan

[73] Assignee: Hitachi, Ltd., Tokyo, Japan

[21] Appl. No.: 792,987

[22] Filed: Oct. 30, 1985

Related U.S. Application Data

[63] Continuation of Ser. No. 555,619, Nov. 28, 1983, abandoned.

[30] Foreign Application Priority Data

Nov. 27, 1982 [JP] Japan ............................. 57-208300

[51] Int. Cl.$^4$ ................ G06K 9/34; G06K 9/00
[52] U.S. Cl. .................................. 382/9; 382/30; 382/38; 382/48
[58] Field of Search ............... 382/9, 30, 37, 38, 48, 382/60

[56] References Cited

U.S. PATENT DOCUMENTS

| | | | |
|---|---|---|---|
| 3,460,091 | 8/1969 | McCarthy et al. | 382/37 |
| 3,500,325 | 3/1970 | Greanias et al. | 382/9 |
| 3,517,387 | 6/1970 | Andrews et al. | 382/9 |
| 3,533,068 | 10/1970 | Hanaki et al. | 382/38 |
| 3,710,321 | 1/1973 | Rubenstein | 382/37 |
| 4,014,000 | 3/1977 | Uno et al. | 382/30 |
| 4,045,773 | 8/1977 | Kadota et al. | 382/9 |
| 4,484,348 | 11/1984 | Shizuno | 382/48 |
| 4,491,965 | 1/1985 | Yoshimura | 382/38 |

OTHER PUBLICATIONS

Rosenfeld et al., "Sequential Operations in Digital Picture Processing", *Journal of the Assoc. for Computing Machinery*, vol. 13, No. 4, Oct. 1966, pp. 471–494.

Primary Examiner—Leo H. Boudreau
Assistant Examiner—Joseph Mancuso
Attorney, Agent, or Firm—Antonelli, Terry & Wands

[57] ABSTRACT

Pattern segmentation and recognition in which handwritten characters are transformed electrically into 2-dimensional image patterns, wherein if ambiguity exists in segmenting a unit pattern including a character from the image patterns, character recognition is not made compulsively, but a plurality of possible unit patterns are first established. Then, the various unit patterns are segmented, and each unit pattern is identified to be a partial pattern, linked patterns, etc., so that each character is recognized on a basis of total judgement, whereby ambiguity of segmentation is resolved.

15 Claims, 16 Drawing Figures

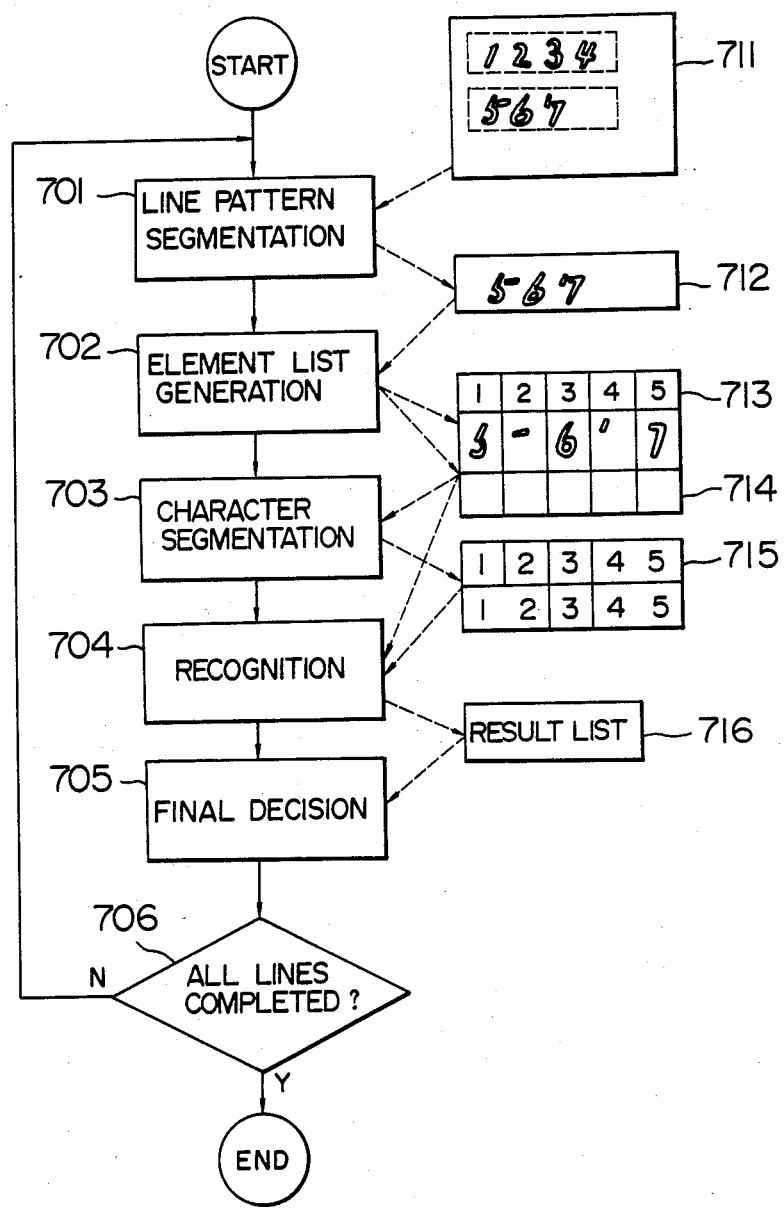

SYSTEM AND METHOD FOR SEGMENTATION AND RECOGNITION OF PATTERNS

This is a continuation of application Ser. No. 555,619, filed Nov. 28, 1983, now abandoned.

BACKGROUND OF THE INVENTION

The present invention relates to a method of segmentation and recognition of patterns and, more particularly, to a method of segmentation and recognition of relaxed handwritten character patterns for use in an optical character reader (OCR).

Conventionally, when an optical character reader (OCR) is used to read handwritten characters, it is required that each character be written correctly within a character frame 11 as shown in FIG. 1(a). The tolerance of over-framing is 1.0–1.5 mm in the vertical direction and sufficiently small as not to jut out into the adjacent frame in the horizontal direction, as shown in FIG. 1(b).

In order to make optical character readers more attractive to the user, it is necessary to free the writer from writing alphanumeric characters in frames peculiar to the OCR as mentioned above, and to allow the writer to write characters in a more relaxed style, as shown in FIGS. 2(a) and 2(b).

The conventional character frame has relatively large dimensions with an inter-frame gap 5 in the range of 0.5–1.0 mm, whereas the character frame used in the relaxed-style OCR system will have smaller dimensions as shown by 12 and 13 in FIGS. 2(a) and 2(b) and will have no inter-frame gap as shown by 6 and 7. As a result, characters may significantly jut out of the frame 12 or 13, and adjacent characters may overlap in the vertical direction or interlace with each other. In addition, when a character is written dividedly, like characters "5" and "M" shown in FIGS. 2(a) and 2(b), for example, a large part of the character may enter in the adjacent frame, posing a difficult problem for the OCR in reading characters. The prior art system cannot cope with these problems for segmenting and reading character patterns correctly.

SUMMARY OF THE INVENTION

In order to overcome the prior art deficiencies, it is an object of the present invention to provide a method of pattern segmentation and recognition which enables reading of characters written in a relaxed style such as those significantly jutting out of the character frame or interlacing with each other.

The present invention resides characteristically in a system and method for pattern segmentation and recognition in which predetermined unit patterns are extracted from a 2-dimensional image pattern, which has been transformed into an electrical signal and fed to a recognition unit, where continuous partial image patterns having the same attribute are extracted from the supplied image pattern. Thereafter, the unit patterns are combined into an input pattern, wherein signals indicating incompleteness and intrinsic category are provided if the input pattern is recognized to be a part of a pattern expressing one category. Signals indicating completeness and the category of the input pattern are provided if the input pattern is recognized as a complete input pattern, and signals indicating contact and the categories of the patterns are provided if the input pattern is recognized to be a plurality of patterns in contact with each other. If an ambiguity exists in segmentation of the unit patterns, a number of hypothetical unit patterns are provided for the recognition unit so that one of the hypothetical unit patterns is selected based on the signals indicating incompleteness and the intrinsic category, the signals indicating completeness and the category of the input pattern, or the signals indicating contact and the categories of patterns, provided by the recognition unit.

BRIEF DESCRIPTION OF THE DRAWINGS

FIG. 9 is a flowchart showing the character segmenting and recognizing processes of the character reader shown in FIG. 8.

DESCRIPTION OF THE PREFERRED EMBODIMENTS

The principle and embodiments of the present invention will now be described with reference to the drawings.

The principle of the present invention is summarized in two points: (1) if there exists ambiguity in segmentation of a pattern, determination is not made compulsively, but instead a number of hypothetical unit patterns are provided for the recognition unit; (2) the recognition unit identifies partial patterns and contact patterns and resolves the ambiguity by checking the integrity of segmentation based on the total judgement of recognition.

FIG. 3 shows various cases of adjacent character patterns. In the case of FIG. 3(a), where a pattern 31 in a frame 21 juts out into a frame 22 of an adjacent pattern 32, the pattern can be segmented correctly by extracting the continuous black area as a pattern element. The method of extracting a continuous black area as a pattern element is known in the art, not only of the case where the character is written correctly within the frame, but also of the case where a pattern element simply juts out of the frame, and such a character pattern can be segmented correctly into a unit pattern. (Refer to an article entitled, "Sequential Operations in Digital Picture Processing" by A. Rosenfeld and J. L. Pfaltz, October 1966, J. ACM, Vol. 14, No. 4, pp. 471–494.)

Figure 3A:
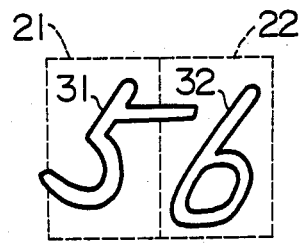
FIGS. 3a–3e are a set of diagrams showing various cases of adjacent character patterns.
Figure 3B:
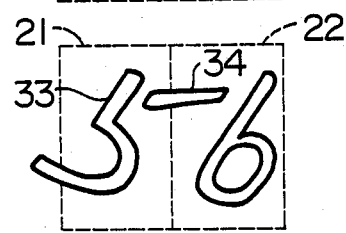

In the case of FIG. 3(b), the character pattern of frame 21 is separated into pattern elements 33 and 34 and a large part of the element 34 being located in the adjacent frame 22. If it is not clear whether the pattern element 34 intrinsically belongs to frame 21 or 22, pattern elements for both cases are transferred to the recognition unit, and a decision on which one of the cases to take as a result is made according to the recognition results.

Figure 3C:
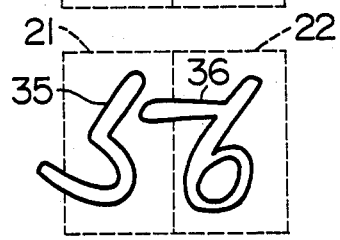
Figure 3D:
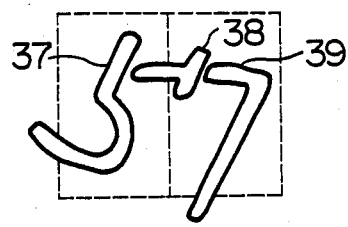

FIG. 3(c) shows the case where a partial pattern element of the character pattern in frame 21 is in contact with the adjacent character pattern in frame 22, and FIG. 3(d) shows the case where separate partial pattern elements of adjacent character patterns are in contact with each other. Character "5" has a partial pattern element in the case of FIG. 3(c), while in the case of FIG. 3(d) both characters "5" and "7" have partial pattern elements in contact with each other.

Figure 3E:
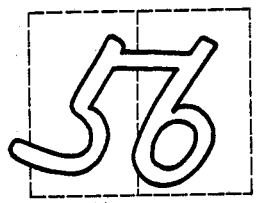

FIG. 3(e) shows the case where complete adjacent character patterns, i.e., each having no partial pattern element, are in contact with each other.

The method of character recognition for the cases shown in FIGS. 3(a)–3(e) will be described in the following.

Figure 4:
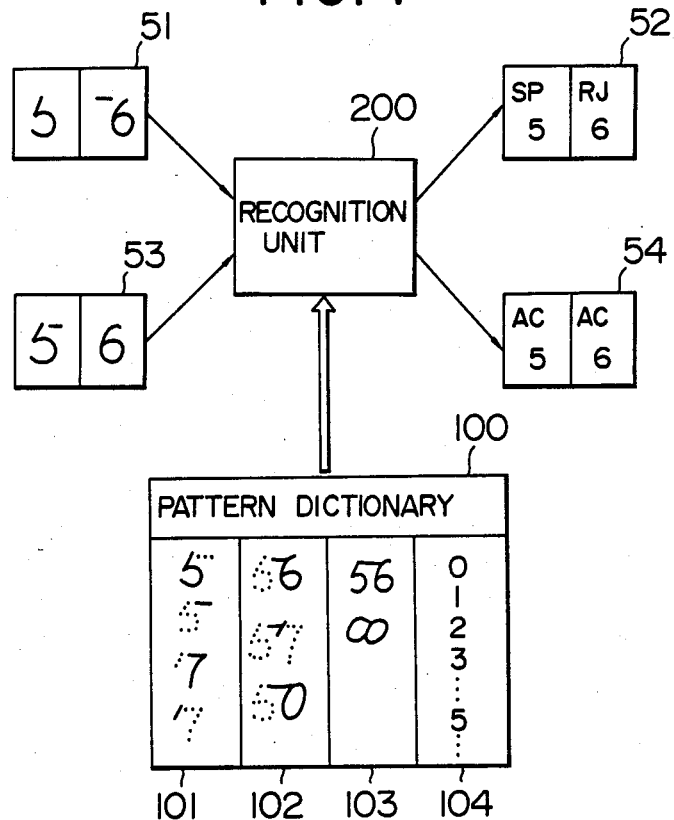
FIGS. 4, 5, 6a, 6b and 7 are diagrams explaining the principle of character recognition according to the present invention.
Figure 5:
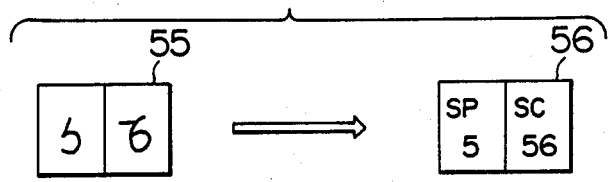
Figure 6A:
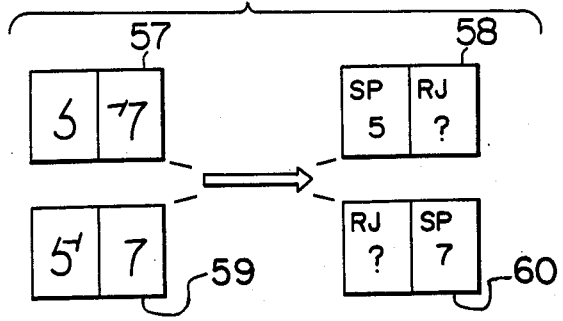
Figure 6B:
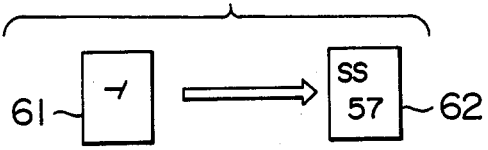
Figure 7:
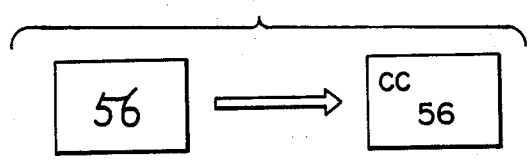

FIGS. 4 through 7 are diagrams showing the principle of pattern recognition according to the present invention. FIG. 4 explains the recognition for a plurality of pattern groups provided by the segmentation unit. FIG. 5 explains the recognition for a character pattern whose partial pattern element is in contact with the adjacent character pattern. FIG. 6 explains the recognition for character patterns whose partial pattern elements are in contact with each other. FIG. 7 explains the recognition for complete character patterns in contact with each other.

First, the method of recognizing a character pattern whose partial pattern element 34 is located in the adjacent character frame as shown in FIG. 3(b) will be described with reference to FIG. 4. In FIG. 4, reference numbers 51 and 53 denote two unit patterns provided by the segmentation unit. The system includes a recognition unit 200 and a pattern dictionary 100 which includes sections of dictionary 101–104. The recognition unit 200 receives two unit patterns 51 and 53, and provides respective recognition results 52 and 54 through the character recognizing process. Namely, the first unit pattern 51 yields the result codes (SP.5) and (RJ.6). The result code (SP.5) signifies a partial pattern of "5" recognized by making reference to the pattern dictionary section 101, and the result code (RJ.6) signifies that the character should be rejected because of being illegible, but possibly it could be read as "6". The second unit pattern 53 yields (AC.5) and (AC.6), which signify that the characters are accepted as "5" and "6". Accordingly, the second recognition result overrides the first and the characters are recognized conclusively as numeric characters "5" and "6".

It should be noted that the dictionary sections 101–104 are newly provided for the pattern dictionary 100 by the present invention, while in the conventional system, only section 104 containing normal character patterns represents the pattern dictionary 100. The dictionary section 101 is a collection of individual partial patterns, the dictionary section 102 is a collection of partial patterns in contact with the adjacent character pattern, and the dictionary section 103 is a collection of linked patterns.

Next, the method of recognizing a character pattern whose partial pattern element is in contact with the adjacent character pattern as in FIG. 3(c) will be described. In this case, the segmentation process yields a unit pattern as shown by 55 in FIG. 5, and the recognition unit provides result codes (SP.5) and (SC.5, 6) as shown by 56. The result code (SC. 5, 6) signifies that an element of character pattern "5" is in contact with the adjacent character pattern "6" as recognized by making reference to the dictionary section 102. Consequently, the characters can be read as numeric characters "5" and "6".

Next, the method of recognizing character patterns whose partial pattern elements are in contact with each other as shown in FIG. 3(d) will be described. In this case, two unit patterns 57 and 59 as shown in FIG. 6(a) are possible, each yielding recognition results 58 and 60, respectively. Also in this case, an isolated pattern element 61, i.e., element 38 in FIG. 3(d), is subjected to pattern recognition, resulting in a result code (SS.5, 7) as shown by 62. The unit pattern 57 is based on the assumption that the pattern element 38 is appended to the right-hand character pattern, while the unit pattern 59 is based on the assumption that the pattern element 38 is appended to the left-hand character pattern. The results (SP.5) and (RJ.?) signify that the first pattern is a partial pattern of character "5" and the second pattern is to be rejected (illegible). The results (RJ.?) and (SP.7) signify that the first pattern is to be rejected (illegible) and the second pattern is a partial pattern of character "7". The result (SS.5, 7) signifies that the pattern is made up of a partial pattern of character "5" and a partial pattern of character "7" in contact with each other, and in this case the dictionary section 102 containing partial patterns in contact with the adjacent character pattern is used for recognition. By totalizing these outputs, the characters are recognized as numeric characters "5" and "7".

Finally, the method of recognizing complete character patterns in contact with each other as shown in FIG. 3(e) will be described. In this case, the linked pattern is not divided, but it is directly transferred to the recognition unit, which searches the dictionary section 103 for the same figure, resulting in an output (CC.5, 6). This output signifies that the pattern is read as characters "5" and "6" in contact, and thus the characters are recognized.

These are the descriptions of the present invention in which the final recognition is reached by totalizing the intermediate recognition results. The final decision is carried out in practice through the process in accordance with the following rules. First, the processes shown in FIGS. 4 through 7 for the cases of patterns shown in FIGS. 3(a) through 3(e), respectively, are summarized as follows:

| | |
|---|---|
| (a) (AC.5) (AC.6) | → (AC.5) (AC.6) |
| (b) (SP.5) (RJ.6) | ⎫ → (AC.5) (AC.6) |
| (AC.5) (AC.6) | ⎬ |
| (c) (SP.5)(SC.5,6) | → (AC.5) (AC.6) |
| (d) (SP.5) (RJ.?) | ⎫ |
| (RJ.?) (SP.7) | ⎬ → (AC.5) (AC.7) |
| (SS.5,7) | ⎭ |
| (e) (CC.5,6) | → (AC.5) (AC.6) |

The intermediate recognition result codes in the left term are rewritten into the recognition result codes in the right term. The generalized manner of code transformation will be called "rewriting rules". The rewriting rules according to the inventive segmentation method are as follows:

$R_1$: $(\overline{AC}.a)$ $(\overline{AC}.b)$ + (AC.a) (AC.b) → (AC.a) (AC.b)
$R_2$: (SP.a) $(\overline{SC}.a,b)$ → (AC.a) (AC.b)
$R_3$: (SP.a) $(\overline{AC}.*)$ + $(\overline{AC}.*)$ (SP.b) → (RCG)
$R_4$: (SP.a) $(\overline{AC}.*)$ + $(\overline{AC}.*)$ (SP.b) + (SS.a,b) → (AC.a) (AC.b)
$R_5$: (CC.a,b) → (AC.a) (AC.b)

In the rules, the notation $\overline{AC}$ signifies the negation of AC, i.e., anything other than AC, and symbol "*" represents an arbitrary value. The rewritten code (RCG)

implies that only a partial pattern with ambiguity of segmentation should be recognized.

The rule R1 is relevant to the aforementioned expressions (a) and (b), concluding the recognition if at least one portion is accepted (recongized) as category a or b even through the remaining portions are not accepted (recognized) so. The rule R2 is relevant to the expression (c), in which characters are accepted (recognized) as a and b if a partial pattern of a is recognized and the contact of the a's partial pattern with the pattern of b is recognized. Rule R3 is relevant to the expression (d), in which a partial pattern with ambiguity of segmentation is recognized if some pattern is not given the same category. The rule R4 is also relevant to the expression (d), concluding the recognition by totalizing recognition results for partial patterns which have been processed by the rule R3. That is, if the pattern is categorized as a pattern which is not recognized as a partial pattern of a, a partial pattern of b, or a pattern made up of a partial pattern of a and a partial pattern of b in contact with each other, acceptance of a and acceptance of b are concluded under total recognition.

The rule R5 is relevant to the expression (e), concluding that a pattern made up of two character patterns in contact with each other from categories a and b gives rise to acceptance of a and acceptance of b.

Figure 1A:
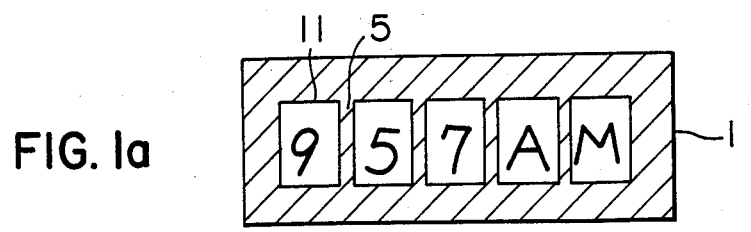
FIGS. 1a and 1b are a set of diagrams showing the character frame of the conventional OCR sheet.
Figure 1B:
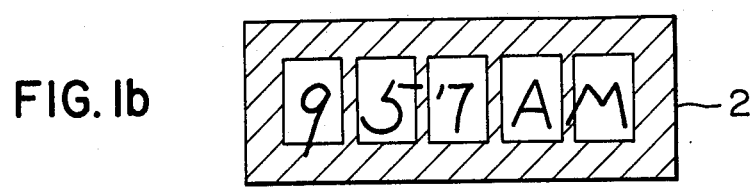
Figure 2A:
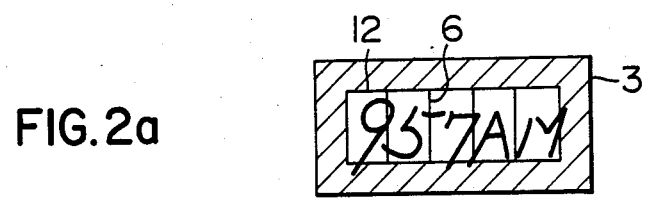
FIGS. 2a and 2b are a set of diagrams showing character frames for relaxed writing conditions.
Figure 2B:
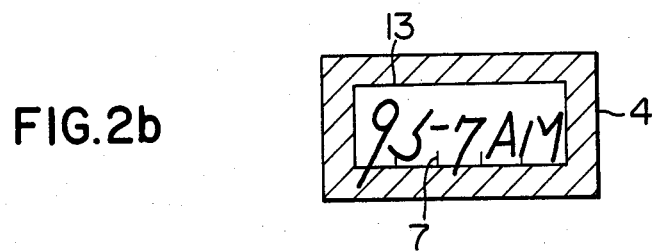
Figure 8:
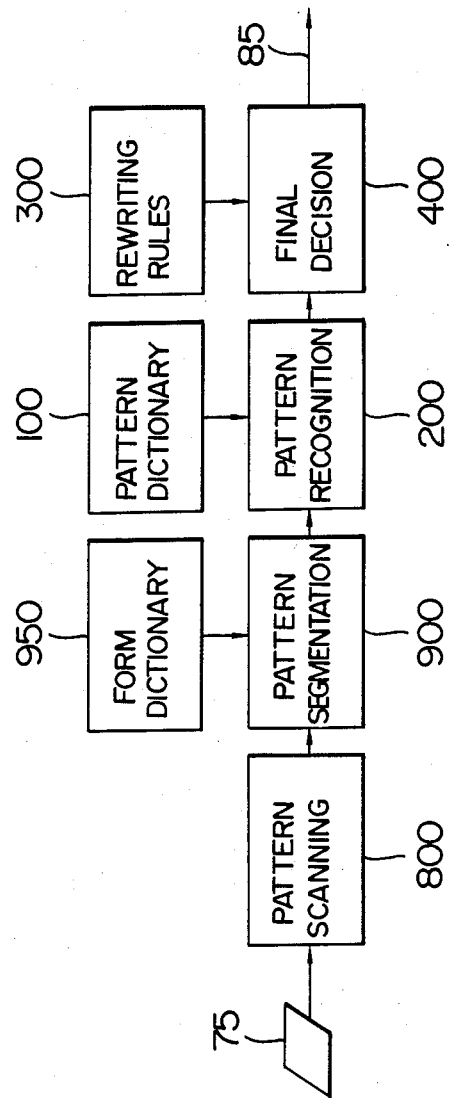
FIG. 8 is a functional block diagram showing the character reader embodying the present invention.

FIG. 8 is a block diagram showing the character reader embodying the present invention. The character reader consists of a pattern scanning unit 800, pattern segmentation unit 900, form dictionary 950, pattern recognition unit 200, pattern dictionary 100, final decision unit 400, and rewriting rule dictionary 300. A form 75 contains characters written in a relaxed style as shown in FIG. 2. The form 75 is entered into the pattern scanning unit 800 so that character patterns are subjected to optoelectric conversion and preprocessing (thresholding and skew correction), and 2-dimensional image patterns in electrical signals are transferred to the pattern segmentation unit 900. The segmentation unit 900 makes reference to the frame position parameters provided by the form dictionary 950 to segment an image pattern into sets of unit patterns, each presumed to constitute one character, and then sends each unit pattern to the recognition unit 200. The recognition unit 200 compares each unit pattern (which may be a partial pattern or a pattern of two characters in contact as mentioned previously) with various reference patterns stored in the pattern dictionary 100, and sends the recognition results in the form of result codes to the final decision unit 400. The final decision unit 400 applies a sequence of rewriting rules stored in the rewriting rule dictionary 300 to the recognition results repeatedly until no applicable rules are left, and performs processing depending on the result of rewriting. Namely, one of the aforementioned rewriting rules $R_1$-$R_5$ is applied selectively to the recognition result codes. The pattern scanning unit 800 can be realized by the known technology, and the explanation thereof will be omitted.

The processes of the pattern segmentation unit 900 and following units will be described in more detail.

FIG. 9 shows the flowchart of the segmentation process and recognition process carried out by the respective units shown in FIG. 8, and also shows data dealt with by the corresponding steps of the processes. In step 701, image patterns 711 are segmented to obtain image patterns 712 for one character line. Subsequently, in step 702, individual pattern elements are extracted based on the continuity of black pattern data and, after the elements have been arranged in order horizontally, an element list 713 is produced. Then the attribute of each element is calculated, and an element attribute list 714 is produced. The attribute of a pattern element includes the coordinates of the top, bottom, right end and left end of the pattern element and the total length of its perimeter.

In step 703, a hypothetical boundary of characters is established based on information in the element attribute list 714 and form dictionary 950, and a character list 715 is produced. The list 715 shows the composing elements of each of various unit patterns. The first unit pattern of FIG. 9 includes elements 1, 2 and 3 as individual characters and elements 4 and 5 in combination as one character, while the second unit pattern shows elements 1 and 2 in combination as a first character, element 3 alone as a second character, and elements 4 and 5 in combination as a third character.

In the subsequent step 704 of recognition, the element list 713, element attribute list 714 and character list 715 are entered and a pattern is reconstructed by assembling elements shown in the character list 715, and the recognition results are stored in a result list 716. The recognition result at this stage is formatted in code, such as the result codes (SP.a), (SC.a, b), (SS.a, b), (CC.a, b), (AC.a), (RJ.a), etc. These result codes codes imply a partial pattern of category a, a partial pattern of a in contact with category b, partial patterns of a and b in contact with each other, connection of categories a and b, category a itself, and a candidate of category a to be rejected, respectively, as mentioned previously.

In step 705, all rules in the rewriting rule dictionary 300 are referred to for the contents of the result list 716 and the rules are applied in sequence repeatedly until no applicable rules are left, and a process depending on the final result will take place.

Although the foregoing embodiment is a character reader for segmenting and recognizing characters, the objective of the invention is not limited to written characters, but the invention can of course be applied generally to patterns, such as the pattern of voice sound.

We claim:

1. A method of segmentation and recognition of patterns comprising the steps of:
    (a) transforming handwritten characters into electrical image patterns;
    (b) extracting individual pattern elements from said image patterns on the basis of the continuity of the data in said image patterns;
    (c) determining the attributes of each of said individual pattern elements;
    (d) forming one or more unit patterns each consisting of one or more individual pattern elements based on the attributes of said pattern elements and the positional relationship of said pattern elements in said handwritten characters;
    (e) comparing each of said unit patterns with reference patterns that include partial patterns and combination patterns, wherein a partial pattern is less than a complete character and a combination pattern is more than a single complete character;
    (f) generating result codes, including the character name of a reference pattern, for each comparing of a unit pattern with said reference patterns; and
    (g) recognizing said handwritten characters in accordance with said result codes.

2. A method of pattern segmentation and recognition according to claim 1, wherein said reference patterns include complete patterns, partial patterns, partial patterns in contact with other complete patterns, and patterns in contact with each other.

3. A method of pattern segmentation and recognition according to claim 2, wherein said comparing step comprises the steps of:
   producing signals indicating incompleteness and the character names of recognized patterns if said unit pattern is determined to be a part of pattern representing one character;
   producing signals indicative of partial contact and the character names of recognized patterns if said unit pattern is determined to be a partial pattern in contact with another complete pattern;
   producing signals indicative of contact and the character names of recognized patterns if said unit pattern is determined to be a plurality of patterns in contact with each other; and
   producing signals indicative of completeness and the character name of recognized patterns if said unit pattern is determined to be complete as a pattern.

4. A method of pattern segmentation and recognition according to claim 3, wherein said step of recognizing said handwritten characters includes applying rewriting rules to said plurality of result codes to obtain a final result.

5. A method of pattern segmentation and recognition according to claim 1, wherein said comparing step comprises the steps of:
   producing signals indicating incompleteness and the character names of recognized patterns if said unit pattern is determined to be a part of a pattern representing one character;
   producing signals indicative of partial contact and the character names of recognized patterns if said unit patern is determined to be a partial pattern in contact with another complete pattern;
   producing signals indicative of contact and the character names of recognized patterns in said unit pattern is determined to be a plurality of patterns in contact with each other; and
   producing signals indicative of the completeness and the character name of a recognized pattern if said unit pattern is determined to be complete as a pattern.

6. A method of pattern segmentation and recognition according to claim 5, wherein said step of recognizing said handwritten characters includes applying rewriting rules to said plurality of unit patterns into result codes to obtain a final result.

7. A system of segmentation and recognition of patterns comprising:
   (a) first means for transforming handwritten characters into electrical image patterns;
   (b) second means for extracting individual pattern elements from said image patterns on the basis of the continuity of the data in said image patterns;
   (c) third means for calculating the attributes of each of said individual pattern elements;
   (d) a form dictionary storing information concerning the positional relationship of said pattern elements in said handwritten characters;
   (e) fourth means for forming unit patterns from said individual pattern elements based on the attribute information obtained from said third means and information obtained from said form dictionary;
   (f) a pattern dictionary storing pattern information, wherein said information includes partial patterns and combination patterns, a partial pattern being less than a complete character, and a combination pattern being more than a single complete character;
   (g) fifth means for matching each of said unit patterns with reference patterns obtained from said pattern dictionary and for generating result codes including the character name of a reference pattern;
   (h) sixth means for recognizing said handwritten characters in accordance with said result codes from said fifth means.

8. A system of segmentation and recognition according to claim 7, wherein said pattern dictionary comprises means for storing information identifying complete patterns, partial patterns, partial patterns in contact with other complete patterns, and patterns in contact with each other.

9. A system of pattern segmentation and recognition according to claim 8 wherein said fifth means comprises means for:
   producing signals indicating incompleteness and the character names of recognized patterns if said unit pattern is determined to be a part of pattern representing one category;
   producing signals indicative of partial contact and the character names of recognized patterns if said unit pattern is determined to be a partial pattern in contact with another complete pattern;
   producing signals indicative of contact and the character names of recognized patterns if said unit pattern is determined to be a plurality of patterns in contact with each other; and
   producing signals indicative of completeness and the character name of a recognized pattern if said unit pattern is determined to be complete as a pattern.

10. A system of pattern segmentation and recognition according to claim 9, further comprising means for transforming said plurality of unit patterns into a one or more of recognition result codes, a final result being obtained by application of rewriting rules to said recognition result.

11. A system of segmentation and recognition according to claim 7, wherein said fifth means comprises means for:
   producing signals indicating incompleteness and the character names of recognized patterns if said unit pattern is determined to be part of a pattern representing one character;
   producing signals indicative of partial contact and the character names of recognized patterns if said unit pattern is determined to be a partial pattern in contact with another complete pattern;
   producing signals indicative of contact and the character names of recognized patterns if said unit pattern is determined to be a plurality of patterns in contact with each other; and
   producing signals indicative of completeness and the character name of a recognized pattern if said unit pattern is determined to be complete as a pattern.

12. A system of pattern segmentation and recognition according to claim 11, further comprising means for transforming said plurality of unit patterns into at least one recognition result code, a final result being obtained by application of rewriting rules to said recognition result.

13. A system of pattern segmentation and recognition according to claim 7, wherein said sixth means includes a rewriting rule dictionary for transforming a plurality of result codes into a character result signal.

14. A method of segmentation and recognition of patterns comprising the steps of:
  (a) transforming written characters into electrical image patterns;
  (b) extracting individual pattern elements including elements representing less than a complete character from said image patterns on the basis of the continuity of the data in said image patterns;
  (c) determining the attributes of each of said individual pattern elements;
  (d) forming a plurality of unit patterns representing different combinations of the pattern elements based on the attributes of said pattern elements and the positional relationship of said pattern elements of adjacent written characters;
  (e) comparing each of said unit patterns with reference patterns including partial patterns, each of the partial patterns being less than a complete character;
  (f) generating result codes, including the character name of a reference pattern, for each comparing of a unit pattern with said reference patterns; and
  (g) recognizing said written characters in accordance with said result codes.

15. A method of recognition of electrical image patterns representing character patterns comprising the steps of:
  (a) extracting individual pattern elements including elements representing less than a complete character from said electrical image patterns on the basis of the continuity of said image patterns;
  (b) determining the attributes of each of said individual pattern elements;
  (c) forming a plurality of character lists of unit patterns based on the attributes of said pattern elements and the positional relationship of said pattern elements in which the pattern elements are grouped hypothetically into one or more unit patterns, each unit pattern consisting of one or more individual pattern elements;
  (d) checking said character lists as to whether each of said unit patterns satisfies any of predetermined conditions relating to the character patterns;
  (e) selecting one of said character lists based on the result of said checking.

* * * * *